United States Patent
Haas et al.

(10) Patent No.: US 7,273,656 B2
(45) Date of Patent: Sep. 25, 2007

(54) PLASTIC COMPOSITE ELEMENTS AND A PROCESS FOR THE PRODUCTION THEREOF

(75) Inventors: Peter Haas, Haan (DE); Rolf Roers, Bocholt (DE); Hartwig Grammes, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 363 days.

(21) Appl. No.: 10/985,096

(22) Filed: Nov. 10, 2004

(65) Prior Publication Data

US 2006/0057395 A1    Mar. 16, 2006

(30) Foreign Application Priority Data

Nov. 13, 2003    (DE) ................................ 103 52 951

(51) Int. Cl.
*B32B 27/36* (2006.01)
*B32B 27/40* (2006.01)
*C08G 18/44* (2006.01)
*C08G 18/42* (2006.01)

(52) U.S. Cl. ..................... 428/423.1; 428/412; 528/44; 528/83

(58) Field of Classification Search ............... 428/423, 428/423.1, 412; 528/44, 83
See application file for complete search history.

(56) References Cited

U.S. PATENT DOCUMENTS

| | | | |
|---|---|---|---|
| 5,569,707 A | 10/1996 | Blum et al. | 524/591 |
| 5,635,559 A | 6/1997 | Brock et al. | 524/839 |
| 2003/0151154 A1 | 8/2003 | Bellucci et al. | 264/41 |

FOREIGN PATENT DOCUMENTS

DE    100 22 280 A1    11/2001

*Primary Examiner*—Duc Truong
(74) *Attorney, Agent, or Firm*—Lyndanne M. Whalen; John E. Mrozinski, Jr.

(57) ABSTRACT

The invention provides composite elements containing a thermoplastic polymer layer, adhering to a layer comprising the reaction product of a reaction mixture containing a prepolymer containing isocyanate groups produced by the reaction of at least one isocyanate and one polycarbonate polyalcohol with a functionality of 2 to 3 and a hydroxyl number of about 40 to about 400 mg KOH/g, based on the condensation of carbonates with diols and/or triols with a molecular weight of about 62 to about 3000 g/mol, the prepolymer having an isocyanate group content of about 5 to about 48%, compounds reactive with respect to isocyanates and optionally catalysts blowing agents and/or auxiliary substances and/or additives. The present invention further provides a process for the production the composite elements.

3 Claims, No Drawings

PLASTIC COMPOSITE ELEMENTS AND A PROCESS FOR THE PRODUCTION THEREOF

FIELD OF THE INVENTION

The invention relates to composite elements containing a thermoplastic polymer layer adhering to a layer which is the product of the reaction of a mixture containing a prepolymer containing isocyanate groups produced by the reaction of at least one isocyanate and one polycarbonate polyalcohol with a functionality of 2 to 3 and a hydroxyl number of about 40 to about 400 mg KOH/g, based on the condensation of carbonates with diols and/or triols with a molecular weight of about 62 to about 3000 g/mol, the prepolymer having an isocyanate group content of about 5 to about 48%, compounds reactive with respect to isocyanates and optionally catalysts, blowing agents and/or auxiliary substances and/or additives is attached. The invention further relates to a process for the production of such composite elements and the use thereof.

BACKGROUND OF THE INVENTION

Polyisocyanate polyaddition products produced by the reaction of isocyanates with compounds reactive with respect to isocyanates, e.g. polyols, i.e. compounds having at least two hydroxyl groups, as well as composite elements of these products with other plastics, are generally known. Stressing of these composite elements by high temperatures and atmospheric humidities often leads to an undesirable detaching of the plastics from the polyisocyanate polyaddition products. Particularly where these composite elements are used in car construction, for which such stressing cannot be ruled out, detaching of the polyisocyanate polyaddition products from the other plastics, and thus destruction of the composite element, is unacceptable.

In the production of the composite elements, and especially of the polyisocyanate polyaddition products, the problem can arise that the starting components, especially the polyol component containing the starting substances that are reactive with respect to isocyanates, do not give stable mixtures. At low temperatures, e.g. below 20° C., individual polyols can tend to flocculate in the polyol component or to sediment in the polyol component. It is important to avoid this problem for the reproducible manufacture of high-quality products.

DE-A 10 022 280 describes a process for the production of composite elements with improved adhesion and humid ageing properties of such composite materials of thermoplastics and polyurethanes. The composite is used e.g. for the production of dashboards, which are conventionally constructed e.g. from a thermoplastic support, a PUR foam and another top layer consisting of e.g. PVC, TPO, ABS, thermoplastic polyurethanes, sprayed polyurethane skins etc.

By using isocyanate prepolymers containing ester groups for the production of polyurethane foams according to DE-A 10 022 280, improved properties are obtained, in particular good adhesion between the thermoplastic and polyurethane foams of this type. When such a composite is stored in humid conditions for up to 80 hours at 80° C. and 80% relative humidity, the composite of thermoplastic and polyurethane foam is intact. After that, however, the composite separates.

SUMMARY OF THE INVENTION

The present invention provides composite elements which, owing to their excellent mechanical properties, can be used e.g. in car construction and in which the adhesion between the plastic and the polyisocyanate polyaddition products adhering thereto is not lost even during long-term storage (>4 days) at 80° C. and 80% relative humidity. In particular, the composite elements are produced with starting components that give stable mixtures and can therefore be used simply and reproducibly. The compounds that are reactive with respect to isocyanates do not sediment or flocculate in the polyol component and/or the isocyanate component.

Through the use of isocyanate prepolymers containing carbonate groups for the production of polyurethane foams, the adhesion between PUR foam and thermoplastic is improved, even under the severe conditions of humid storage with a long stressing period. This is all the more surprising as carbonate groups are considered extremely sensitive to hydrolysis.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages and so forth in the specification are to be understood as being modified in all instances by the term "about."

The present invention provides composite elements containing a thermoplastic polymer layer adhering to a layer which is the product of the reaction of a mixture containing a prepolymer containing isocyanate groups produced by the reaction of at least one isocyanate and one polycarbonate polyalcohol with a functionality of 2 to 3 and a hydroxyl number of 40 to 400 mg KOH/g, based on the condensation of carbonates with diols and/or triols with a molecular weight of 62 to 3000 g/mol, the prepolymer having an isocyanate group content of 5 to 48%, compounds reactive with respect to isocyanates and optionally catalysts, blowing agents and/or auxiliary substances and/or additives.

The composite elements according to the invention can contain as the thermoplastic polymer, e.g. polyphenylene oxide (PPO), polyvinyl chloride (PVC), acrylonitrile-styrene-acrylate (ASA), polycarbonate (PC), thermoplastic polyurethane (TPU), polyethylene, polypropylene, acrylonitrile-butadiene-styrene (ABS).

The composite elements preferably contain thermoplastic polyolefin sheet (TPO), such as polyethylene and/or polypropylene, polyvinyl chloride (PVC), styrene-maleic anhydride (SMA) and/or a polycarbonate/styrene-acrylonitrile and/or acrylonitrile-butadiene-styrene blend (PC/SAN and/or ABS) as the plastics.

The plastics can be used in the form of conventional materials for the production of the composite elements, e.g. as sheets, generally with a thickness of 0.2 to 2 mm. Sheets of this type are commercially available and their production is generally known. The sheets preferably have a thickness of 0.2 to 2 mm. Sheets containing at least two layers can also be used, one layer containing e.g. an ASA and/or polycarbonate material.

The plastics of styrene-maleic anhydride (SMA) and/or a polycarbonate/styrene-acrylonitrile/acrylonitrile-butadiene blend (PC/SAN and/or ABS) can be used in the form of materials for the production of the composite elements, e.g. as a stiffening part for instrument panels or door side parts.

According to the invention, the polyisocyanate polyaddition products, e.g. polyurethanes, which can optionally exhibit isocyanurate and/or urea structures, are adhesively attached to the plastic. The production of these polyisocyanate polyaddition products, preferably the polyurethanes, which can be present in compact or, preferably, cellular form, e.g. as a flexible foam, semi-rigid foam or rigid foam, particularly preferably as a semi-rigid foam, takes place according to the invention by the reaction described below.

To achieve the improved adhesion between thermoplastic polymer layer and the polyisocyanate polyaddition product layer, especially under warm, humid conditions, and to produce stable starting components, at least one polycarbonate polyalcohol with a functionality of 2 to 3, preferably 2, and a hydroxyl number of 40 to 400, preferably 40 to 100, particularly preferably 40 to 80 mg KOH/g, based on the condensation of carbonates with diols and/or triols with a molecular weight of 62 to 3000 g/mol is used in the form of a prepolymer containing isocyanate groups for the production of the polyisocyanate polyaddition products. As diol and/or triol, for example trimethylolpropane, neopentyl glycol, polytetrahydrofuran (PTHF), aliphatic diols with 2 to 12 carbon atoms, e.g. ethylene glycol, 1,3-propanediol, 1,5-pentanediol, 1,6-hexanediol, 1,4-butanediol, ether diols and/or ether triols based on ethylene oxide and/or propylene oxide, e.g. diethylene glycol, dipropylene glycol, triethylene glycol, tripropylene glycol, tetraethylene glycol, tetrapropylene glycol, can be used. The polyester polyol alcohol is preferably based on 1,6-hexanediol, 1,4-butanediol and/or monoethylene glycol as the alcohol component.

This polycarbonate polyalcohol is reacted according to the invention with at least one isocyanate, which is described by way of an example at a later point, to form a prepolymer containing isocyanate groups, the prepolymer having an isocyanate group content of 5 to 48%, preferably of 20 to 30%. The isocyanate group content is expressed as % and is determined according to the standard ASTM D 1638. The isocyanate content according to the invention of the prepolymer is obtained by processes generally known to the person skilled in the art, e.g. by reacting the polycarbonate polyol and the isocyanate in a ratio by weight of 0.01:1 to 0.1:1. The reaction can take place at a temperature of 30 to 120° C., e.g. stirring, generally for a period of 10 to 180 min, optionally in the presence of known catalysts in generally known vessels, pieces of apparatus or reactors.

The production of the composite elements according to the invention can take place in that
a) a prepolymer containing isocyanate groups obtainable from the reaction of at least one isocyanate and one polycarbonate polyalcohol with a functionality of 2 to 3 and a hydroxyl number of 40 to 400 mg KOH/g, based on the condensation of carbonates with diols and/or triols with a molecular weight of 62 to 3000 g/mol, the prepolymer having an isocyanate group content of 5 to 48%,
b) isocyanate reactive compounds, and optionally
c) catalysts,
d) blowing agents and/or
e) auxiliary substances and/or additives are reacted in the presence of a thermoplastic polymer.

To produce the products according to the invention, the prepolymer (a) and the isocyanate reactive compound (b) and optionally (d) can be reacted in quantities such that the equivalent ratio of NCO groups of (a) to the sum of the reactive hydrogen atoms of (b) and optionally (d) is preferably 0.3 to 1.8:1, particularly preferably 0.4 to 1.0:1 and especially 0.4 to 0.6:1. If the product contains at least some bound isocyanurate groups, a ratio of NCO groups to the sum of the reactive hydrogen atoms of 1.5 to 60:1, preferably 1.5 to 8:1, is applied.

The reaction to form the product can be carried out e.g. by manual casting, by high-pressure or low-pressure machines or by RIM processes (reaction injection molding), in open or preferably closed molds. Suitable processing machines are commercially available (e.g. from Elastogran, Isotherm, Hennecke, Kraus Maffei and others).

To produce compact products, it has proved advantageous if the components for the production of compact polyisocyanate polyaddition products are degassed before processing by applying a vacuum in order to obtain bubble-free moldings. In the case of processing with polyurethane (PU) machines, it is also advantageous if the feed vessels are under reduced pressure during processing.

The starting components are generally mixed and, for example, introduced into the mold at a temperature of 0 to 100° C., preferably 20 to 80° C., depending on the application. The mixing can be performed mechanically using an agitator or a screw mixer, as already stated, or can take place in a high-pressure mixing head.

The reaction of the reaction mixture can be carried out e.g. in molds which are preferably capable of being temperature-controlled and sealed. Especially for the production of products that are as smooth as possible, those molds having a surface that is as smooth as possible or has defined patterns, and preferably no surface irregularities, cracks, scratches or impurities, are preferably used as molds. The surface of the mold can be treated e.g. by polishing.

Commercially available molds, the surface of which is made of e.g. of steel, aluminum, enamel, TEFLON, epoxy resin or another polymeric material, can be used as molds for the production of the products, the surface optionally being chrome plated, e.g. hard chrome plated. The molds should preferably be capable of being temperature-controlled to enable the preferred temperatures to be set, sealable and preferably equipped to exert a pressure on the product.

The conversion to the polyisocyanate polyaddition products takes place at a mold temperature, and preferably also a temperature of the starting components, of 20 to 120° C., more preferably 30 to 100° C., most preferably 35 to 80° C., for a period of 0.5 to 30 min, more preferably 1 to 5 minutes. The reaction in the mold takes place according to the invention in direct contact with thermoplastic. polymer layer. This can be achieved e.g. in that before the reaction, the thermoplastic polymer layer is placed in the mold, preferably free of folds if the thermoplastic polymer layer is a film, and then, as already described, the reaction mixture is fed on to it and the mold is preferably sealed. Fibers as component (e) can be used both in the reaction mixture and in the form of mats or fabrics. If mats or fabrics are used as component (e), these can, for example, be placed in the mould on the thermoplastic polymer layer before feeding in the reaction mixture, and then the reaction mixture, which in this case does not have to contain any fibers (e) in addition to the mats or fabrics, can be fed into the mold.

(Cyclo)aliphatic and/or especially aromatic polyisocyanates, preferably diisocyanates, can be used as the isocyanates. To produce the composite elements according to the invention, aromatic diisocyanates are particularly suitable, preferably diphenylmethane diisocyanate (MDI) and toluene diisocyanate (TDI).

As the isocyanate reactive component, compounds that are reactive with respect to isocyanates can be used, e.g. polyether polyalcohols, polyester polyalcohols and/or polycarbonate diols, preferably polyether polyols and/or polyester polyalcohols, e.g. the polyester polyalcohols described at the beginning for the production of (b), preferably with a molecular weight of 500 to 10000, more preferably 1000 to 6000 and preferably with a functionality with respect to isocyanate groups of 2 to 6. Furthermore, the isocyanate reactive compounds (b) according to the invention can be used in a mixture with chain-extending and/or crosslinking agents. The chain-extending agents are predominantly 2-functional alcohols with molecular weights of 60 to 499, e.g. ethylene glycol, propylene glycol, 1,4-butanediol, 1,5-pentanediol. The crosslinking agents are compounds with molecular weights of 60 to 499 and 3 or more active H atoms, preferably amines and particularly preferably alcohols, e.g. glycerin, trimethylolpropane and/or pentaerythritol.

As catalysts, compounds that strongly accelerate the reaction of isocyanate with the isocyanate reactive component, for example, can be used. Tertiary amines and/or organometallic compounds that are known for this purpose, especially tin compounds, are suitable, for example. Those catalysts leading to the lowest possible fogging, i.e. to the lowest possible emission of volatile compounds from the reaction product, are preferably used as catalysts, e.g. potassium acetate and/or Li salts and/or tertiary amines with at least one functional hydroxyl group.

For the production of foamed products, e.g. polyurethane flexible, semi-rigid or rigid foams, which can optionally have urea and/or isocyanurate structures, compounds having a chemical or physical action can be used as blowing agents. Water, which forms carbon dioxide by reaction with the isocyanate groups, can preferably be used as a blowing agent having a chemical action. Examples of physical blowing agents, i.e. those inert compounds that evaporate under the conditions of polyurethane formation, are e.g. (cyclo)aliphatic hydrocarbons, preferably those with 4 to 8, particularly preferably 4 to 6 and especially 5 carbon atoms, partially halogenated hydrocarbons or ethers, ketones or acetates. The quantity of blowing agents used depends on the desired density of the foams. The different blowing agents can be used individually or in any mixtures with one another.

The reaction takes place optionally in the presence of auxiliary substances and/or additives, such as e.g. fillers, fibers, e.g. in the form of fabrics and/or mats, cell regulators, surface-active compounds and/or stabilizers against oxidative, thermal or microbial decomposition or ageing.

The composite elements according to the invention exhibit markedly improved adhesion between the thermoplastic polymer layer and the polyisocyanate polyaddition products layer owing to the use of the polycarbonate polyalcohols described at the beginning, i.e. adhesion to the thermoplastic support material, especially to PC/ABS and SMA. This improved adhesion guarantees that, when the foam is torn off the support, the foam remains on the support over its entire surface. Thus, according to the invention, it was possible to achieve an adhesion between the layers when measured according to DIN 53 289 or 53 530 in the initial state and after storage in warm and in warm, humid conditions, reaching a peel force of $\geq 2.5$ N/cm. This applies particularly after prolonged humid ageing.

The composite elements according to the invention are preferably used as components in vehicle, aircraft or property construction, e.g. as dashboards, door trims, parcel shelves, control panels, arm rests or door mirrors.

By using the polycarbonate polyalcohols in the form of prepolymers, the stable integration of the polycarbonate polyalcohols in the isocyanate component is achieved. Flocculation or sedimentation of the polycarbonate polyalcohols, e.g. in the polyol component, can thus be successfully avoided.

Essential to the invention is therefore the use of prepolymers produced by the reaction of at least one isocyanate and one polycarbonate polyalcohol with a functionality of 2 to 3 and a hydroxyl number of 40 to 400 mg KOH/g, based on the condensation of carbonates with diols and/or triols with a molecular weight of 62 to 3000 g/mol, the prepolymer having an isocyanate group content of 5 to 48%, for the production of stable polyurethane systems, especially polycarbonate polyalcohols containing isocyanate components.

The invention will be explained in more detail using the following examples, which are provided for the purposes of illustration and not limitation.

EXAMPLES

Description of the Starting Substances

Polyol 1: Polyether polyol with an OH number of 28 and at least 80% primary OH groups, produced by addition of propylene oxide/ethylene oxide (83/17) to trimethylolpropane as starter.

Polyol 2: Polyether polyol with an OH number of 28 and at least 80% primary OH groups, produced by addition of propylene/ethylene oxide (83/17) to trimethylolpropane as starter and with a grafted filler content of 20 wt. % of styrene/acrylonitrile (40%/60%).

Polyol 3: Polyether polyol with an OH number of 500, produced by addition of propylene oxide to triethanolamine as starter.

Polyisocyanate 1:

Polyisocyanate from the diphenylmethane series, obtained by phosgenation of an aniline/formaldehyde condensate, with an isocyanate content of 31.5 wt. % and a viscosity of 200 mPa.s at 25° C.

Production of Polyisocyanate Prepolymer 1 (According to the Invention):

900 g of Polyisocyanate 1 were heated with 100 g of a polycarbonate hexanediol (DESMOPHEN 2020 from Bayer AG) with an OH number of 56 for 2 hours at 95° C.

NCO content: 28%

Viscosity: 1250 mPa.s at 25° C.

Production of Polyisocyanate Prepolymer 2 (Comparison)

900 g of Polyisocyanate 1 were reacted with 100 g of the polyester polyalcohol from DE-A 10 022 280 (page 3, line 15) of adipic acid and ethylene glycol with an OH number of 56.

NCO content: 28%

Foaming Examples

Polyurethane moldings foams were produced with the formulations given in Table 1. For this purpose, polyol, water and activator were pre-mixed. The isocyanate was then added, the reaction mixture was homogenized for 10 seconds at 1200 rpm and then poured into a sheet mould at a temperature of 40° C. (size 200*200*20 mm), on the base of which a 104×150 mm thermally injection-molded sheet of the polycarbonate/ABS-based BLENDUR T65 type from Bayer AG, with a thickness of 3 mm, had previously been centrally fixed.

|  | Example | | |
|---|---|---|---|
|  | 1* | 2 | 3* |
| Polyol 1 | 70.7 | 70.7 | 70.7 |
| Polyol 2 | 23.0 | 23.0 | 23.0 |
| Polyol 3 | 5.5 | 5.5 | 5.5 |
| Water | 2.8 | 2.8 | 2.8 |
| Dimethylaminopropylurea | 0.6 | 0.6 | 0.6 |
| Polyisocyanate 1 | 50 | 33.3 | 33.5 |
| Prepolymer 1 | — | 19.5 | — |
| Prepolymer 2 | — | — | 19.5 |
| Start time [s] | 18 | 18 | 18 |
| Rise time [s] | 97 | 97 | 97 |
| Density [kg/m$^3$] | 62 | 62 | 62 |

*Comparative example not according to the invention

Mix ratio: 100 parts by weight of polyol formulation (polyols, water, dimethylaminopropylurea) to the quantity of isocyanate given in the table.

The quantities given in the table are parts by weight.

Investigation into the Adhesion Between Foam and Thermoplastic

The foam on the foam-backed thermoplastic sheet was cut down to the support with a knife at a distance of 15 mm from the edge.

In Example 1, the foam could be removed from the sheet without any residues.

In Example 2, an intact foam covering remained on the thermoplastic support sheet over the entire surface.

In Example 3, an intact foam covering remained on the thermoplastic support sheet over the entire surface.

To determine the humid ageing behavior of the adhesion, the samples were stored at a temperature of 80° C. with a relative humidity of approx. 80%.

Adhesion After Humid Ageing:

Example 2

After 80 h, an intact foam layer was present on the support*.
After 100 h, an intact foam layer was present on the support*.
After 120 h, an intact foam layer was present on the support*.
*after tearing off a section of foam 15 mm thick in each case.

The test was not continued after 135 h with the same results.

Adhesion After Humid Ageing:

Example 3

After 80 h, an intact foam layer is present on the support*.
After 100 h, 50% foam is still present on the support*.
After 120 h, 20% foam is still present on the support*.
*after tearing off a section of foam 15 mm thick in each case.

Example 1

No humid ageing test was performed for example 1, because no foam adhered to the support even before humid ageing.

The composite elements according to the invention display marked improvements in humid ageing compared with the known composite elements.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite element comprising:
   a layer comprising at least one thermoplastic polymer; adhering to a layer comprising the reaction product of a reaction mixture containing,
      a prepolymer containing isocyanate groups produced by the reaction of at least one isocyanate and at least one polycarbonate polyalcohol with a functionality of 2 to 3 and a hydroxyl number of about 40 to about 400 mg KOH/g, based on the condensation of carbonates with diols and/or triols with a molecular weight of about 62 to about 3000 g/mol, the prepolymer having an isocyanate group content of about 5 to about 48%,
      an isocyanate reactive compound, and optionally
      at least one of catalysts, blowing agents, auxiliary substances and additives.

2. A process for the production of composite elements containing at least one thermoplastic polymer and, adhering thereto, a polyisocyanate polyaddition product comprising reacting in the presence of the at least one thermoplastic polymer:
   a) a prepolymer containing isocyanate groups obtainable from the reaction of at least one isocyanate and at least one polycarbonate polyalcohol with a functionality of 2 to 3 and a hydroxyl number of about 40 to about 400 mg KOH/g, based on the condensation of carbonates with diols and/or triols with a molecular weight of about 62 to about 3000 glmol, the prepolymer having an isocyanate group content of about 5 to about 48%,
   b) compounds reactive with respect to isocyanates, and optionally
   c) catalysts,
   d) blowing agents and/or
   e) auxiliary substances and/or additives.

3. In a process for the production of one of a vehicle or aircraft dashboard, door trim, parcel shelf, control panel, arm rest or door mirror, the improvement comprising including the composite element according to claim 1.

* * * * *